United States Patent
Ahlberg et al.

(10) Patent No.: US 10,845,241 B2
(45) Date of Patent: Nov. 24, 2020

(54) METHOD OF HYPERSPECTRAL MEASUREMENT

(71) Applicant: Glana Sensors AB, Linköping (SE)

(72) Inventors: Jörgen Ahlberg, Linköping (SE); Ingmar Renhorn, Linköping (SE)

(73) Assignee: Glana Sensors AB, Linköping (SE)

( * ) Notice: Subject to any disclaimer, the term of this patent is extended or adjusted under 35 U.S.C. 154(b) by 272 days.

(21) Appl. No.: 15/781,017

(22) PCT Filed: Dec. 1, 2016

(86) PCT No.: PCT/EP2016/079492
§ 371 (c)(1),
(2) Date: Jun. 1, 2018

(87) PCT Pub. No.: WO2017/093431
PCT Pub. Date: Jun. 8, 2017

(65) Prior Publication Data
US 2020/0141803 A1    May 7, 2020

(30) Foreign Application Priority Data
Dec. 1, 2015   (SE) ...................... 1551568

(51) Int. Cl.
*G01J 3/28*    (2006.01)
*G01J 3/36*    (2006.01)
(Continued)

(52) U.S. Cl.
CPC ............ *G01J 3/2823* (2013.01); *G01J 3/36* (2013.01); *G01J 3/513* (2013.01); *H04N 9/0455* (2018.08); *G01J 2003/2826* (2013.01)

(58) Field of Classification Search
CPC ........... G06K 19/06037; A61K 31/4188; G01J 3/2823; H04N 9/0455
See application file for complete search history.

(56) References Cited

U.S. PATENT DOCUMENTS

2012/0257047 A1   10/2012   Biesemans et al.
2013/0120754 A1   5/2013   Wilson et al.
(Continued)

FOREIGN PATENT DOCUMENTS

WO   2014140189 A2   9/2014

OTHER PUBLICATIONS

Nayar Shree K., et al"Generalized Mosaicing: Wide Field of View Multispectral Imaging" IEEE Transactions on Pattern Analysis and Machine Intelligence, vol. 24 No. 10, Oct. 2002, 15 pages.
(Continued)

*Primary Examiner* — John J Lee
(74) *Attorney, Agent, or Firm* — Moore & Van Allen PLLC; Jeffrey R. Gray

(57) ABSTRACT

The present disclosure provides a method of providing a hyperspectral image of a scene comprising a point (p). The method comprises providing an imaging device (10, 10') comprising a two-dimensional image sensing unit (12, 13, 14) having a spectral characteristic, which varies along at least one direction in a plane parallel with an image sensor (13), acquiring a first two-dimensional image (I1) of the scene, the first image comprising the point (p), wherein the spectral content of the scene varies along the direction as a consequence of the varying spectral characteristic of the image sensing unit (12, 13, 14), moving the imaging device (10, 10') and the scene relative to each other, acquiring a second two-dimensional image (I2) of the scene, the second image comprising the point (p), wherein the spectral content of the scene varies along the direction as a consequence of the varying spectral characteristic of the image sensing unit (12, 13, 14), identifying the point (p) in the second image (I2) as a second pixel at a position (x2, y2) depicting the point (p), providing a spectral vector (S(p)) of the point, and providing an updated spectral vector (S'(p)) of the point (Continued)

based on an applicability vector (A(p)) of the point (p), the spectral vector (S(p)) of the point, a spectral value (z2(p)) of the second pixel and an applicability vector (B(p)) of the second pixel.

19 Claims, 8 Drawing Sheets

(51) Int. Cl.
*H04N 9/04* (2006.01)
*G01J 3/51* (2006.01)

(56) References Cited

U.S. PATENT DOCUMENTS

| | | | | |
|---|---|---|---|---|
| 2015/0141847 A1* | 5/2015 | Sarvazyan | ............ | A61B 90/37 |
| | | | | 600/478 |
| 2015/0153226 A1* | 6/2015 | Comstock, II | ........ | G01J 3/0229 |
| | | | | 356/326 |
| 2018/0197052 A1* | 7/2018 | Yanson | ............ | G06K 19/06037 |

OTHER PUBLICATIONS

WIPO; International Search Report and Written Opinion for International Application No. PCT/EP2016/079492 dated Mar. 24, 2017, 17 pages.
PRV; Office Action for Swedish Application No. SE-21079717 dated Sep. 7, 2016, 6 pages.
WIPO; International Preliminary Report on Patentability for International Application No. PCT/EP2016/079492, dated May 6, 2018, 10 pages.

* cited by examiner

METHOD OF HYPERSPECTRAL MEASUREMENT

TECHNICAL FIELD

The present disclosure relates to a method of hyperspectral measurement, which can be used also for providing three dimensional mapping data.

BACKGROUND

In both military and civilian remote sensing the use of hyperspectral cameras, that is, cameras that can measure received light in many wavelengths simultaneously, is increasing. In a hyperspectral camera, the number of observed wavelengths is dozens or hundreds, not just red, green and blue like a common color camera. Thus, each pixel contains the observed spectral signature of an object or a point on the ground, i.e., a set of values, one for each observed wavelength. After compensating for atmospheric effects, sunlight, etc., the spectral signature can be used to determine the material of each pixel. This can be used to, for example, distinguish between different types or conditions of vegetation (environmental monitoring, precision agriculture) or distinguish between natural and artificial greenery (find camouflage nets hidden in nature).

At the same time, the need for 3D mapping has increased, and it is therefore common to complement hyperspectral airborne mapping with a laser scanner. Combining data from the two sensors, a three-dimensional hyperspectral map is created. In recent years, methods for so-called passive 3D, which uses "standard" cameras for estimating 3D structure, have been introduced. However, such methods cannot be used with existing hyperspectral cameras, as these observe one line at the ground, not an entire image. Thus they do not see a point on the ground from several angles, which is required for the estimate of the 3D structure.

WO2014/140189A2 discloses a method of providing hyperspectral images

SUMMARY

An object of the present disclosure is to provide methods and devices which improve the availability of hyperspectral measurement and/or 3D mapping, e.g. by reducing weight, cost of manufacturing and/or need for processing power.

According to a first aspect, there is provided a method of providing a hyperspectral image of a scene comprising a point. The method comprises providing an imaging device comprising a two-dimensional image sensing unit having a spectral characteristic, which varies along at least one direction in a plane parallel with an image sensor, acquiring a first two-dimensional image of the scene, the first image comprising the point, wherein the spectral content of the scene varies along the direction as a consequence of the varying spectral characteristic of the image sensing unit, moving the imaging device and the scene relative to each other, acquiring a second two-dimensional image of the scene, the second image comprising the point, wherein the spectral content of the scene varies along the direction as a consequence of the varying spectral characteristic of the image sensing unit, identifying the point in the second image as a second pixel at a position depicting the point, providing a spectral vector $S(p)$ of the point, and providing an updated spectral vector $S'(p)$ of the point based on an applicability vector $A(p)$ of the point, the spectral vector $S(p)$ of the point, a spectral value of the second pixel and an applicability vector $B(p)$ of the second pixel.

The image may be a hyperspectral image, i.e. an image, which for each pixel of the image provides spectral information of four or more wavelengths, preferably five or more or ten or more, e.g. 5-150 wavelengths.

The imaging device may present a spectral characteristic which varies, that is, different parts of the image sensor record light at different wavelengths. In consequence, the spectral content may vary over any image produced by the imaging device.

A two-dimensional image may be defined as an image that actually depicts the scene. That is, the image may be a true depiction of the scene, apart from the fact that the spectral content varies along the direction.

The relative movement may preferably be along a direction which is parallel with the direction along which the spectral characteristic varies.

The number of wavelengths provided for by the applicability vector may be typically smaller than the number of wavelengths and/or pixels available from the image sensing unit along the direction. Typically, the number of wavelengths may be 5-150, 5-100, 5-50 or 10-30.

The elements of the applicability vector $A(p)$ may be normalized values. The applicability vector $A(p)$ may also be an index vector, e.g., $A(p)=[0 \ldots 0, 1, 0 \ldots 0]$ to indicate the specific wavelength of the position (x, y) of the point (p) in an image.

The elements of the applicability vector $B(p)$ may be normalized values. The applicability vector $B(p)$ may also be an index vector, e.g., $B(p)=[0 \ldots 0, 1, 0 \ldots 0]$ to indicate the specific wavelength of the position of the pixel depicted the point in an image.

By using this method, a spectral vector of each point may be provided that contains sufficient information for it to be useful, but which is still of a manageable size. Thus processing and storage requirements may be mitigated and consequently cost and size of the imaging device.

The method may further comprise providing the applicability vector $A(p)$ of the point to describe, with respect to predetermined wavelengths, the spectral characteristic of the image sensing unit at a position where the point is depicted.

An applicability vector $A(p)$ may be provided for each point p and is updated as more data on the point is received.

The applicability vector $A(p)$ may provide a measure of the reliability of measurement at each point to control the weight given to the spectral vector $S(p)$ when new measured values are introduced. The applicability vector $A(p)$ may also be an index vector, e.g., $A(p)=[0 \ldots 0, 1, 1, 1, 0 \ldots 0]$ to indicate the specific wavelengths of the measured value of the point (p) in an image.

The method may further comprise providing the applicability vector $B(p)$ of the second pixel, said applicability vector $B(p)$ describing, with respect to a predetermined wavelength, the spectral characteristic of the image sensing unit at the second pixel.

A new applicability vector $B(p)$ may be provided for each pixel and for each new second image.

This applicability vector $B(p)$ may provide a measure of the reliability of the measurement at each pixel to control the weight given to the measured value $z(p)$ from the second image when incorporated into the spectral vector $S(p)$.

The method may further comprise providing an updated applicability vector $A'(p)$ based on the applicability vector $A(p)$ of the point and the applicability vector $B(p)$ of the second pixel.

An updated applicability vector A'(p) may be provided as a maximum, on an element by element basis, of the applicability vector A(p) of the point and the applicability vector B(p) of the second pixel.

For example, each element $A_i'(p)$ of the updated applicability vector A'(p) may be provided as $\max(A_i(p), B_i(p))$.

Identifying the point may comprise using the spectral vector S(p) of the point.

The identifying may comprise identifying the point based on a difference between the second spectral value and the spectral vector S(p).

For example, the point may be identified based on a minimal difference relative to the spectral vector.

The identifying may comprise identifying the point based on the spectral vector (S(p)), the second spectral value, the applicability vector A(p) of the point and the applicability vector B(p) of the second pixel.

For example, a match may be provided based on norm $((S(p)-z2(p))\cdot {}^*A(p)\cdot {}^*B(p))$.

The identifying the point in the second image may comprise providing a model of a neighborhood of the point in one of the images, and matching the model to the one of the images.

The method may further comprise determining a respective observation angle of the point based on respective positions of the point (p) in the first and second images and a reference distance, and determining a distance between the imaging device and the point based on the angles and the reference distance.

A reference distance may be a distance between the positions of the imaging device when acquiring the images, or a known distance between the imaging device and a part of the scene, or between known parts of the scene.

Providing a spectral vector S(p) of the point may comprise assigning a first spectral value of a first pixel depicting the point in the first image.

Providing a spectral vector S(p) of the point may comprise receiving the spectral vector S(p) already updated based on the first image.

The varying spectral characteristic may be provided by a variable optical filter arranged adjacent the image sensor and the method may further comprise providing the applicability vector $A_i(p)$ of the point based on a transmittance of the optical filter at each wavelength at the respective position of the image sensor where the point is identified.

A "variable optical filter" may be defined as a filter, which only lets through the light of a specific wavelength, but which wavelength varies in at least one direction in the plane of the filter. The variation may be in a first direction of the filter and the filter characteristic may be constant in a direction perpendicular to the first direction. The filter characteristic should be known at any part of the filter. For example, the filter characteristic may vary linearly along the first direction. Also, the filter may be continuous along the first direction, such that longer wavelengths are transmitted at one edge of the filter and shorter wavelengths at the opposite edge of the filter.

The variable optical filter may be arranged in an optical path between a lens and the image sensor. Typically, the variable optical filter may be provided immediately adjacent the image sensor.

The variable optical filter may cover the entire effective surface of the image sensor. That is, all light that is recorded by the image sensor will have passed through the filter.

For example, the applicability vector A(p) of the point p may be provided as $A_i(p)=\tau_{xy}(\lambda_i)$ for each wavelength, wherein $\tau_{xy}$ is the transmittance of the filter at position x, y and i=1 ... N.

An element $A_i(p)$ of the applicability vector A(p) of the point p may be a normalized value of $\tau_{xy}(\lambda_i)$.

The filter may vary continuously along the direction, preferably over at least 90% of a sensor length in the direction.

The filter may present at least two spaced-apart portions having the same transmittance.

The spectral vector S(p) of the point may be provided as an N-dimensional vector comprising a predetermined number of wavelengths $\lambda_1 \ldots \lambda_N$, wherein N preferably is 5-150.

A respective spectral vector S(p) may be provided for a predetermined number of points in the scene, said predetermined number of points being sufficient to positively identify an object or absence of an object in the scene.

Acquiring the first and/or second image may comprise acquiring an image wherein the point occurs only once.

Acquiring the first and/or second image may comprise acquiring an image wherein the point occurs at least twice.

The method may further comprise determining a respective observation angle of the points (p) based on respective positions of the occurrences of the point (p) in the first and/or second images and a distance which is an intrinsic distance of the imaging device.

The intrinsic distance may be e.g. a distance between the portions of the image sensor where the occurrences of the point are recorded, a distance between focal points of lenses or a distance between lens and image sensor.

The imaging device used in the method may comprise an optical variable bandpass filter.

The method may comprise estimating, e.g. interpolating, at least one element of the spectral vector, which element corresponds to a wavelength for which measurement has been made with respect to the point.

The method may further comprise, if the point has moved more than one column on the image sensing unit between the first and second images, then estimating, e.g. interpolating, elements of the spectral vector corresponding to wavelengths where no measurement has been done.

The estimation (e.g. interpolation) may be performed based on the applicability vector.

For example, the value of the element(s) that is(are) being estimated may be determined partially by adjacent values and partially by the value of the applicability vector of the point, for example as a weighting factor.

Alternatively, or additionally, the applicability vector may be updated based on the element that has been estimated, e.g. in the same manner as disclosed with respect to the formation of the 2D hyperspectral image.

According to a second aspect, there is provided a method of providing a hyperspectral 3D representation of an object, comprising providing a plurality of spectrally varying images depicting the object, providing a 3D reconstruction of the object based on the plurality of spectrally varying images, and assigning a hyperspectral signature to a plurality of 3D points on a surface of the object.

A "spectrally varying image" is an image, i.e. a two dimensional representation, wherein the spectral content of the object depicted varies along at least one direction as a consequence of the varying spectral characteristic of the image sensing unit.

The spectrally varying images may be received online, essentially in real time as they are captured, or they may be received from a storage medium for use in a post processing step.

In this method, providing a 3D reconstruction of the object may comprise providing a set of intrinsic parameters for the camera, such as focal length, lens distortion, etc., providing a set of extrinsic parameters for the camera, such as camera position and orientation, and providing a set of 3D points on the surface of at least part of the object.

A 3D point may be defined as a set of coordinates describing the position of the point.

The method may further comprise providing a 3D surface polygon model of at least part of the object.

The method may further comprise, for at least some of the spectrally varying images, projecting the at least some of the 3D points onto an image plane of the spectrally varying image based on the extrinsic and intrinsic parameters, to determine respective image specific coordinates corresponding to said 3D points.

"Image specific coordinates" are coordinates which are specific to one spectrally varying image, and which describe the location of a specific 3D point in that specific spectrally varying image.

The method may further comprise traversing at least some of the camera parameters for at least some of the reconstructed 3D points, identifying a matching 3D point were the projection of the 3D point on the spectrally varying image results in valid image coordinates, and associating an index of the spectrally varying image with coordinates of that 3D point.

Preferably, all intrinsic and extrinsic camera parameters may be traversed for each reconstructed 3D point.

The method may further comprise reconstructing a hyperspectral signature of at least some of the 3D points by traversing the associations of spectrally varying image indexes for the 3D point to provide a spectral vector for the 3D point.

The method may further comprise estimating, e.g. interpolating, elements of the spectral vector corresponding to wavelengths where no measurement can be found among the spectrally varying images.

In the method, assigning a hyperspectral signature to one of the 3D points may comprise identifying the 3D point in a first one of the spectrally varying images, identifying the 3D point in a second one of the spectrally varying images as a second pixel at a position depicting the 3D point, providing a spectral vector of the 3D point, providing an updated spectral vector of the 3D point based on an applicability vector of the 3D point, the spectral vector of the 3D point, a spectral value of the second pixel and an applicability vector of the second pixel.

According to a third aspect, there is provided an imaging device, comprising a two-dimensional image sensor, presenting first and second mutually orthogonal directions, a optical filter, arranged in an optical path to the image sensor, wherein the optical filter is an optical bandpass filter, the transmittance of which varies along on the first direction and being constant along the second direction, wherein the optical filter extends over at least 90%, preferably 95% or preferably 99% of a length of the image sensor in the first and second directions, respectively, and wherein the imaging device is arranged to acquire two-dimensional images of a scene, wherein the spectral content of the scene as depicted on the images varies along the first direction as a consequence of the varying transmittance of the optical filter.

The optical filter may be continuous along the first direction.

The filter may thus vary linearly or non-linearly. Typically, such a filter does not contain any two portions (spaced apart in the first direction, which have the same transmittance.

The optical filter may present at least two spaced-apart portions having the same transmittance.

The imaging device may further comprise a lens, which is arranged in an optical path towards the image sensor, wherein said lens provides one focal point.

The imaging device may further comprise a lens or lens set, which is arranged in an optical path towards the image sensor, wherein said lens or lens set provides at least two focal points.

The imaging device may further comprise a processing device, which is configured to perform the method as disclosed above.

The present disclosure provides a new device and a method that together solve several problems with existing technology. The new device is based on mounting a newly developed optical filter on top of the sensor chip in a digital camera. The filter only lets through the light of a specific wavelength, but which wavelength varies linearly along the filter. Thus, in the resulting image, pixels along one edge of the image show the amount of light with long wavelength (e.g., red light), and pixels along the opposite edge show the amount of light with short wavelength (e.g., blue light). If the camera is mounted in an aircraft and moves over an area, the light from a point on the ground is first measured at one wavelength, and as the object moves in the image, it will be measured at different wavelengths. When the ground point eventually passes out of the field of view, two things have been achieved: The incoming light from the ground point has been measured in different wavelengths, and it has also been measured from different angles. In principle, the 3D position of the point as well as its spectral signature can then be computed, as detailed below.

The proposed device has several benefits over existing technology: The weight is low compared to existing hyperspectral cameras, enabling the device to be carried by small electrical drones; commercially available components can be used, keeping the price down as well as allowing a high spatial resolution; simultaneous measurement of spectral signature and 3D structure can be done.

DETAILED DESCRIPTION

Figure 1:
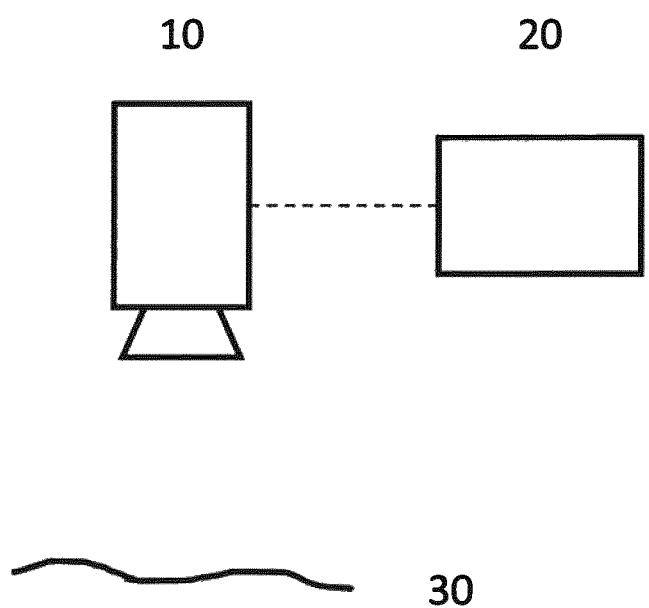
FIG. 1 schematically illustrates an imaging system 10, 20.
Figure 2:
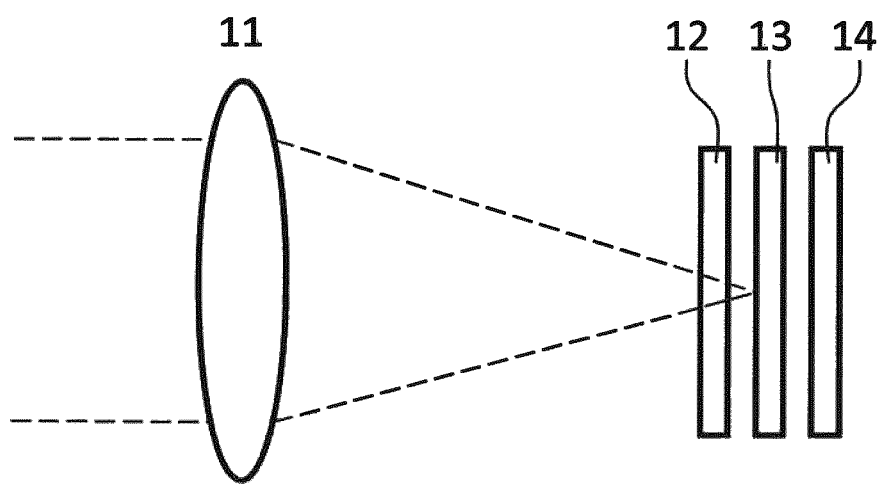
FIG. 2 schematically illustrates an image sensing unit.

Referring to FIG. 1, the device may be embodied as an electro-optical sensor 10 consisting of a sensor chip with a focal plane array (FPA) 13 and read-out electronics 14, an optical filter 12, and optics 11, such as a lens, see FIGS. 1 and 2. The sensor chip and optics can be standard components from existing cameras, such as high-end DSLRs or machine vision cameras. The optical filter may be attached on the FPA, or in the direct proximity to of the FPA, or it may be manufactured as a layer of the FPA.

Figure 9:
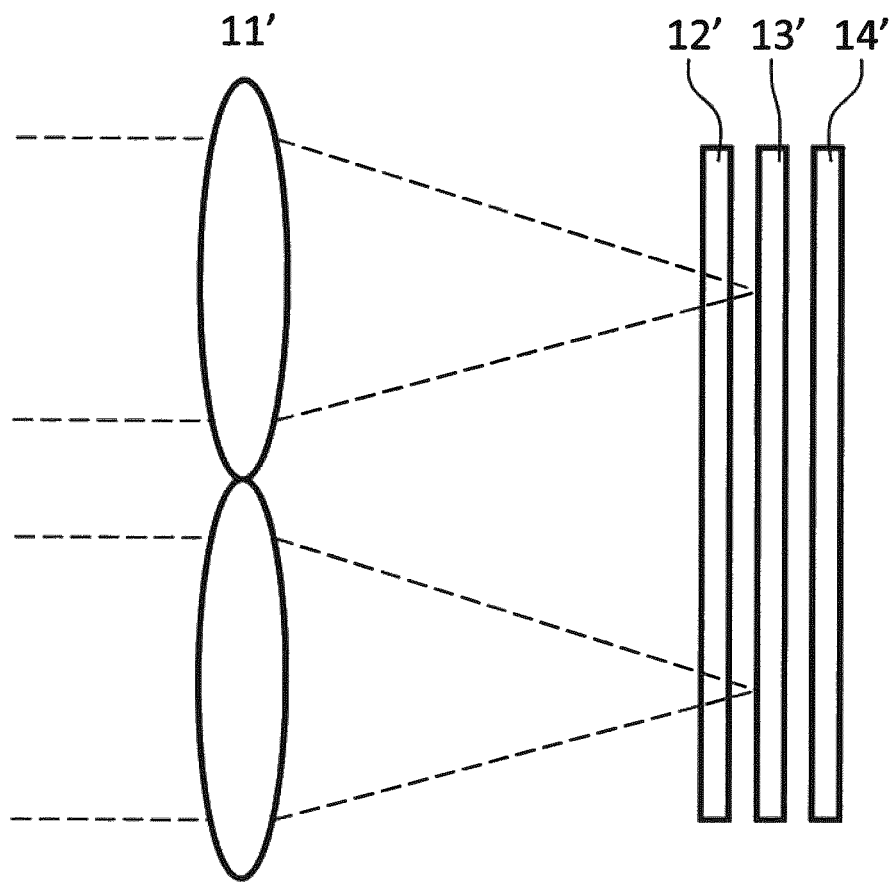
FIG. 9 schematically illustrates an image sensing unit comprising more than one lens.

Referring to FIG. 9, the device may comprise a lens set 11', which is arranged in an optical path towards an optical filter 12', a focal plane array (FPA) 13' and read-out electronics 14'.

The lens set 11' may comprise at least two lenses to provide at least two focal points. The lenses may be arranged to immediately adjacent each other e.g. in a row, in a column or in other patterns, or be arranged spaced from each other e.g. in a row, in a column or in other patterns.

The lens set may be formed as separate lens parts, which are mounted in the desired pattern. Alternatively, the lens set may be formed as one or more components, each of which making up two or more effective lens portions.

The lenses or lens portions may be formed as traditional lenses or as any other type of structure providing the function of a lens, such as a diffractive optical element.

The lens set 11' may comprise one lens providing at least two focal points.

The optical filter may be a bandpass filter letting light pass only in a narrow wavelength band, centered at a wavelength $\lambda_c$. This center wavelength varies over the filter, so that the center wavelength is a function of the position x, y, see FIG. 3, that is $\lambda_c = \lambda_c(x, y)$. Such a filter is here called an optical variable bandpass filter (OVBF). In the preferred implementation, the center wavelength varies continuously along one of the dimensions (here called x) of the filter, so that the center frequency is a function of x only, that is $\lambda_c = \lambda_c(x)$. Also, in the preferred implementation, $\lambda_c(x)$ is a linear function, and the filter is then said to be a linearly variable filter (LVF). However, for the purposes of this invention, the filter is neither required to be linear or one-dimensional as long as it is known and preferably continuous.

Figure 3A:
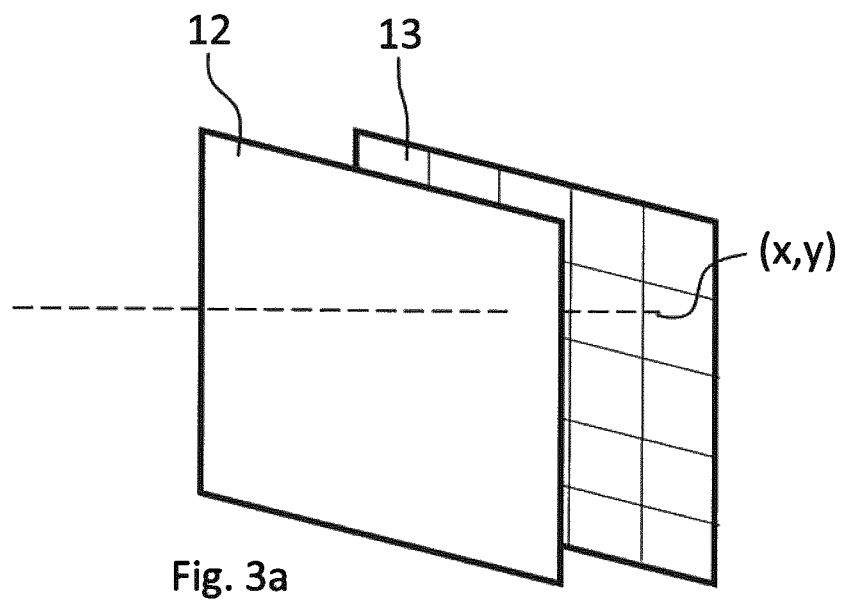
FIGS. 3a-3c schematically illustrate parts of the image sensing unit.
Figures 3B, 3C:
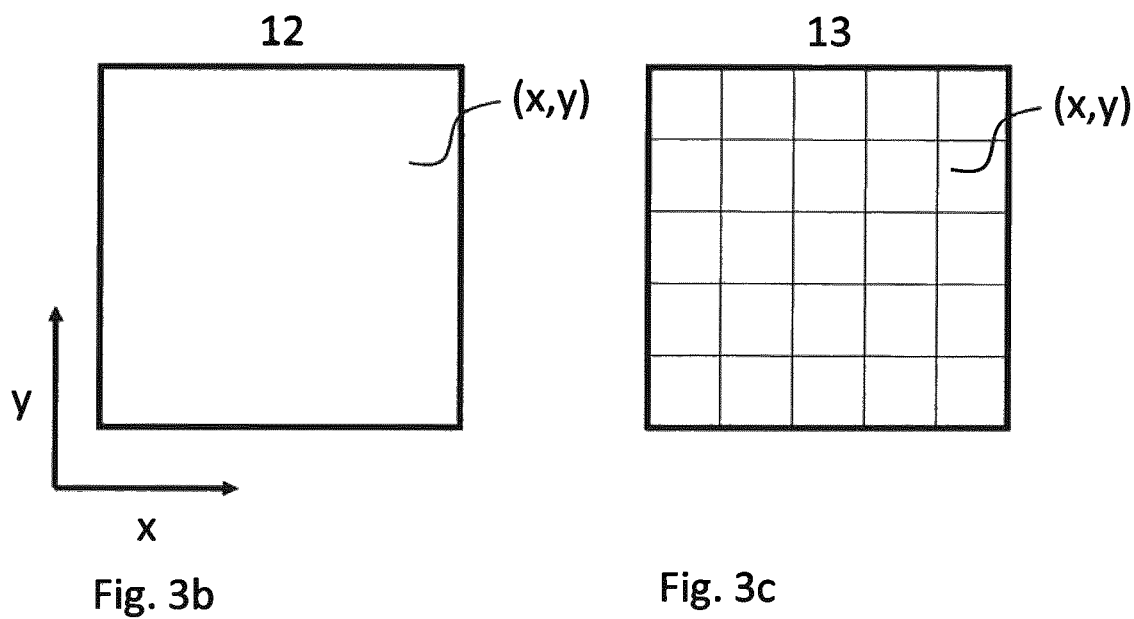

As the OVBF is mounted on, or very close to, the FPA, the light registered by a sensor element at position x, y will only contain wavelengths close to $\lambda_c(x, y)$, as illustrated in FIG. 3. When the sensor and the observed surface 30 are static, each point on the surface will thus be observed in a specific wavelength.

Figure 4:
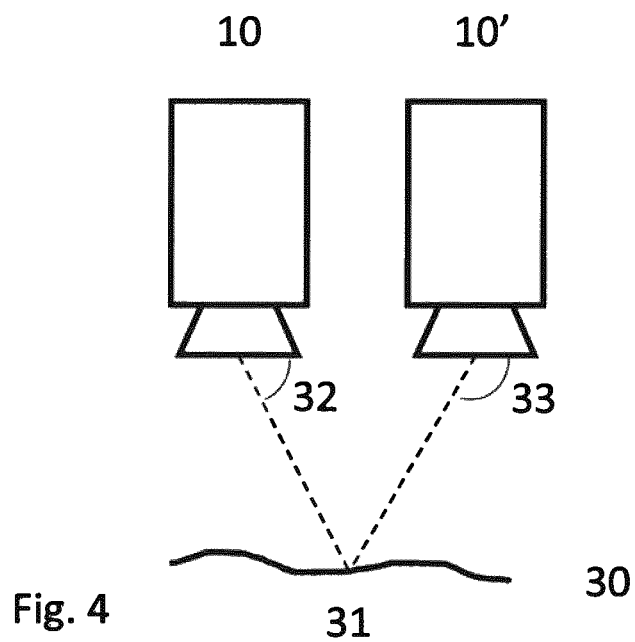
FIG. 4 schematically illustrates the camera 10, 10' at two different positions.

When there is relative motion between the sensor and the surface, the projection by the optics of a certain point p on the object will move across the FPA. This is illustrated in FIG. 4, where a point 31 is first observed by the sensor 10 at one position and then by the sensor 10' at another position. When the sensor at the first position 10 observes the point 31, it will be projected on a sensor element 15 at position $x_1$, $y_1$ on the FPA and the light is filtered by the OVBF 12 at the same position $x_1$, $y_1$. When the sensor at the second position 10' observes the point 31, it will be projected on a sensor element 16 at position $x_2$, $y_2$ on the FPA and the light is filtered by the OVBF 12 at position $x_2$, $y_2$.

When the lens or the lens set provides at least two focal points, the projection by the lens or the lens set of a point p on the object may provide at least two different images of the object comprising the point p on different positions of the FPA. This is illustrated in FIG. 9.

When a point p is thus observed at by different sensor elements 15, 16, a spectral signature X(p) can be estimated for each such point p. For an LVF, the vector S(p) has the same number of elements as the number of sensor elements along the x-direction on the FPA, so that a measurement on the i:th column on the FPA corresponds to the i:th value in the vector S(p). Moreover, if the projection of a point p moves more than one column on the FPA between two observations, there will be gaps, i.e., the missing elements of the spectral vector S(p) corresponding to the wavelengths where no measurement is done). The applicability vector A(p) may be used to interpolate the missing elements such that the gaps of the spectral vector S(p) can be removed.

For a high resolution FPA, with thousands of sensor elements along each column, this requires large amounts of memory and processing power, as the vector S(p) would contain thousands of values for each tracked point p. While such an embodiment is technically feasible, its practical usefulness may be limited by factors such as the available memory and processing capacity.

Figures 5A, 5B:
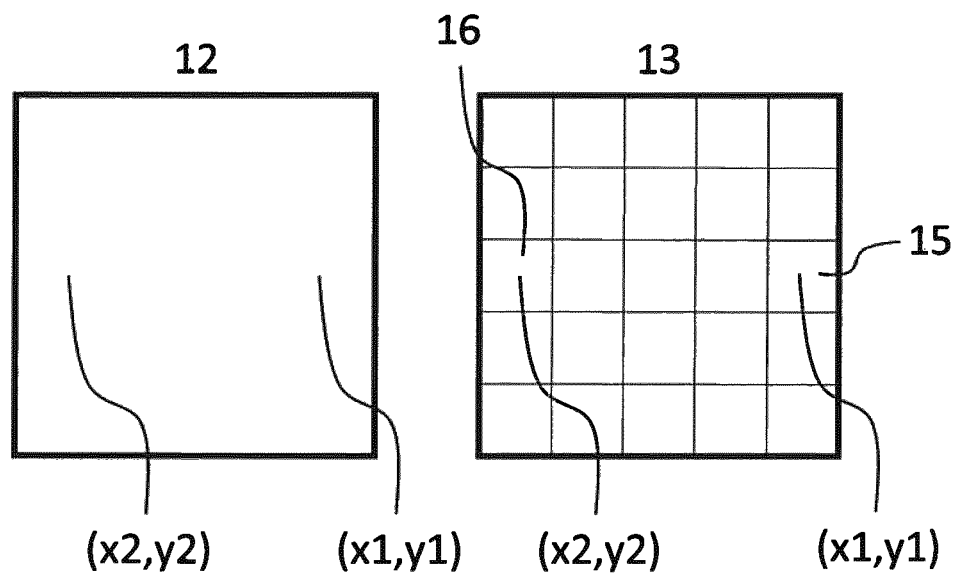
FIGS. 5a-5b schematically illustrate the parts of the image sensing unit.
Figure 6A:
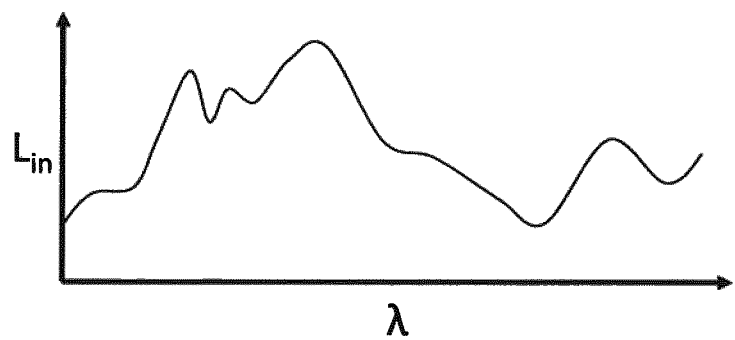
FIGS. 6a-6c schematically illustrate the derivation of a part of a spectral vector S(p).
Figure 6B:
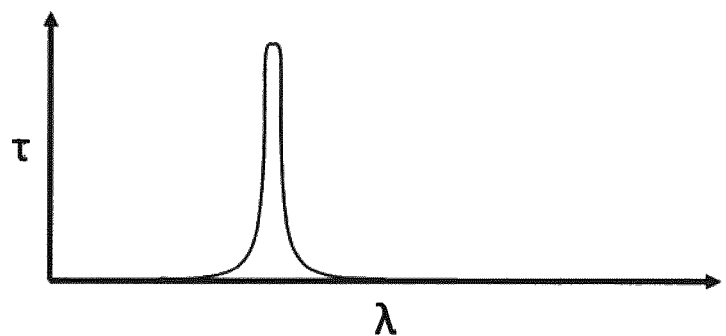
Figure 6C:
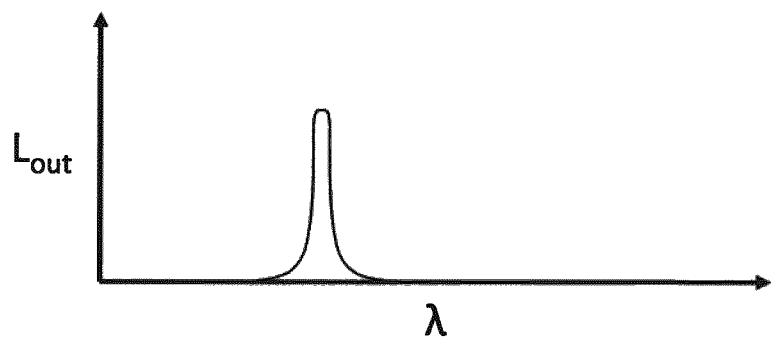
Figure 7:
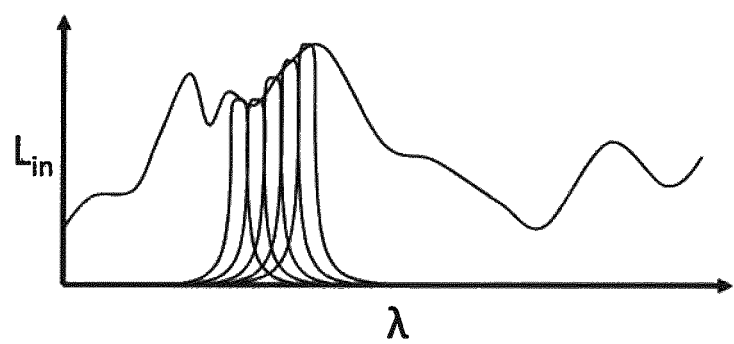
FIG. 7 schematically illustrates the spectral vector S(p) as a representation of the actual spectrum.

The OVBF is at each point (x, y) characterized by its spectral transmittance $\tau_{x,y}(\lambda)$, that is the amount of the incoming light at each wavelength A that passes through the filter. The spectral radiance of the light that has passed the filter at point (x, y) is $L_{out}(\lambda) = \tau_{x,y}(\lambda) * L_{in}(\lambda)$, where $L_{in}(\lambda)$ is the spectral radiance of the incoming light, as illustrated in FIG. 5. By definition of a bandpass filter, the transmittance function $\tau_{x,y}(\lambda)$ is centered around $\lambda_c(x, y)$.

In the present invention, the above-mentioned measurements of light radiating from a point p at different wavelengths (corresponding to different positions on the FPA) are collected into an N-dimensional spectral vector S. The values of S are estimates of $L_{in}(\lambda)$ for a number (N) of wavelengths $\lambda_1 \ldots \lambda_N$, where N is the dimensionality of S. N can be chosen arbitrarily considering the needs of the application and the amount of available memory and computational power. Typical values of N may be 5-50, preferably 5-25, 5-15 or 5-10.

When the first measurement z of a point p is made, at position (x, y) on the FPA, the values of S(p) are set to the retrieved measurement value z. In addition, an applicability vector A(p) for the point p is created. The applicability vector takes its values $A_i(p)$ from the known transmittance of the filter at each wavelength, that is $A_i(p) = \tau_{x,y}(\lambda i)$ for $i = 1 \ldots N$.

Each time an additional measurement is made at point p, the measurement gives a new measurement value z(p) and an associated applicability vector B(p). The spectral signature S(p) is then updated taking into account the new measurement as well as the old and the new applicability vectors. In its simplest form, this update is done by setting each value $S_i(p)$ in the spectral signature S(p) to $$S_i(p) * A_i(p) + z(p) * B_i(p).$$

Figure 8A:
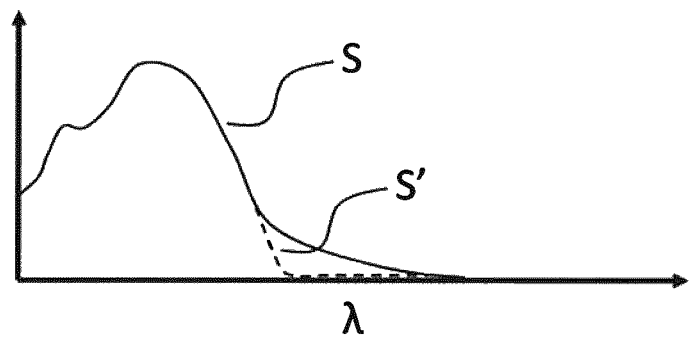
FIGS. 8a-8c schematically illustrate the updating of a spectral vector S(p).
Figure 8B:
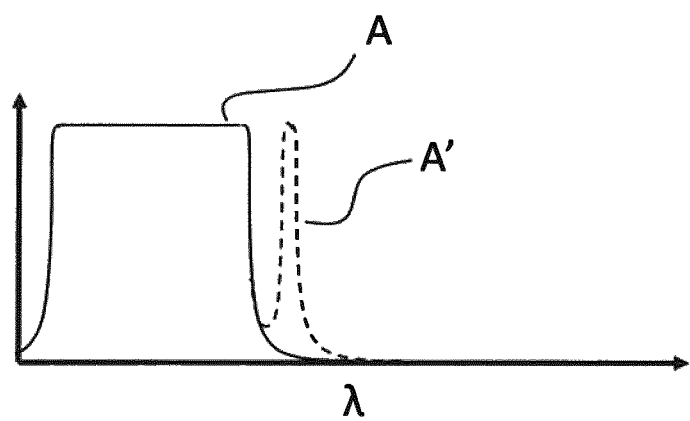
Figure 8C:
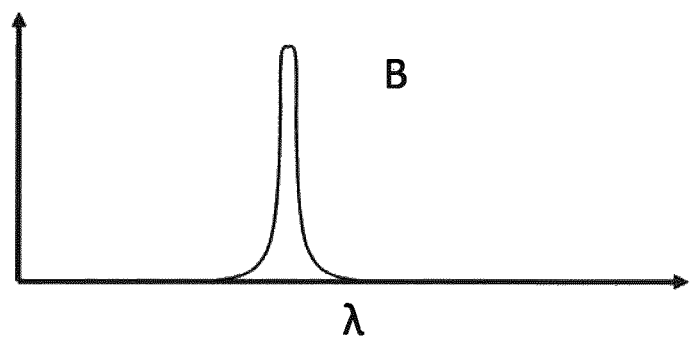

FIG. 8a illustrates the current spectral signature S corresponding to the spectral vector S(p) and the updated spectral signature S corresponding to the updated spectral vector S'(p), FIG. 8b illustrates the current applicability function A corresponding to the applicability vector A(p) and the updated applicability function A' corresponding to the updated applicability vector A'(p). FIG. 8c illustrates the applicability function B corresponding to the applicability vector B(p) used to update the spectral vector S(p) and the applicability vector A(p). The measurement value z(p) in the FIGS. 8a-8c is assumed to be close to zero (as an example) such that the updated S'(p) have values close to zero where the applicability vector B(p) has high values in specific wavelengths. As can be seen in FIG. 8b, the updated applicability function A' corresponding to the updated applicability vector A'(p) shows at which wavelengths spectral information is added to S(p).

Other update schemes can be used as well, for example a non-linear function or a Kalman filter. The applicability vector A(p) is updated accordingly.

When the point p has been observed from two different angles (32 and 33 in FIG. 4), and it can be established that it is the same point p that is observed at these angles, the relative 3D position of point p can be estimated by triangulation. For the estimate to have good precision, the angle difference between the two observations should be as large as possible (up to 90 degrees) and/or the estimate be based on multiple, not only two, observations. Methods for simultaneous estimation of sensor motion and 3D position of multiple points are known from the literature.

As mentioned, it must be established that a point 31 observed at by the sensor 10 at one position at one angle 32 is the same point observed by the sensor 10' at a second position at a second angle 33. Methods for tracking points through a time sequence of images are known from the literature—examples are optical flow and KLT-tracking.

Thus, with the present invention, the 3D position of multiple points on a surface (30 in FIGS. 4, 5a, 5b), such as the Earth, can be estimated, and at the same time, the amount of light radiated from the same points can be measured at different wavelengths.

Note that in the present invention, the tracking does not need to be causal. If a buffer of images is kept in the memory of the processing unit (20), tracking and 3D structure computation can be done in either temporal direction, or in both directions, or as a batch computation.

A problem that will appear with existing tracking methods is that a point p and its neighborhood will not appear the same at different angles, due to the optical filter. For example, a red cross on green background will appear as a white cross on a black background at one angle (when the cross is projected on a part of the sensor chip where light with wavelength corresponding to the color red can pass through the filter) and a black cross on a black background at another angle. Such change of appearance will increase the uncertainty of the tracking, which leads to less reliable estimates of 3D structure.

Tracking may be done using an adaptive model. Since the appearance of the neighborhood of p will change gradually, a model that updates continuously during the tracking process will enhance the accuracy of the tracking and thus also the accuracy of the 3D estimate. Adaptive models that can be used for such tracking are known from the literature, and can, for example be based on storing an image patch, an image descriptor (such as SIFT, SURF or other descriptors known from the literature), or a representation of a probability distribution field (such as a kernel density estimators, histograms, channel coded vectors, or parameterized distributions).

The tracking may be enhanced by exploiting spectral information. That is, a point p of the scene and/or a neighborhood around the point p, is not only characterized by its appearance, but also by its spectral characteristics. This is particularly useful when the projection of a point p on the FPA is not following a straight line but returns to a column (corresponding to a specific wavelength) that has been previously measured. The model matching in the above-mentioned tracking process can then be improved by adding spectral matching, i.e. comparing the element of a spectral vector S(p) being the closest correspondence to the wavelength of the hypothetical matching measurement z'(p) and tracking the point p to the position of the pixel where the hypothetical matching measurement z'(p) is done.

The spectral matching may comprise computing a match between a hypothetical matching measurement z with the current applicability vector B(p), the current spectral vector S(p) and its applicability vector A(p) as $$\mathrm{norm}((S(p)-z(p))\cdot {}^*A(p)\cdot {}^*B(p)),$$

where ".*" denotes element by element multiplication and norm( ) is a vector norm, such as the L1 norm or the L2 norm. The resulting match value is combined with the match value from the adaptive model, the exact formulation dependent on the specific adaptive model used.

The adaptive model and the spectral matching may be replaced by an adaptive spatio-spectral model, such as a representation of a 3D distribution field with a corresponding 3D applicability field. A 3D distribution field can, for example, be represented and estimated using kernel density estimators, 3D histograms, channel coded 3D fields, or parameterized distributions. Whereas this is not very complicated to implement in the processing unit, the computational complexity will increase, and a balance of tracking performance and complexity must be found for optimum performance.

The arrangement of FIG. 9 provides some additional opportunities.

Initially, the use of two or more lenses, which in turn may provide two or more depictions of the point p on the image sensor, makes it possible to calculate a distance to the point p. The accuracy of such distance calculation is dependent on factors, such as the size of the image sensor, the resolution of the image sensor and the precision of the filter and other optics involved. Typically, a distance between the simultaneous depictions of the point on the image sensor may be used as a reference distance.

If the filter 12' used is of the same kind as the one 12 previously discussed, then the different depictions of the point on the image will be with different spectral contents. Hence, the methods disclosed above may need to be used in order to identify the point p at its different occurrences on the same image.

However, the filter 12' may be of the kind which provides two or more portions having the same or very similar transmittance. In such an embodiment, the depictions of the point may be with the same, or almost the same, spectral contents, which may facilitate the identification of the point at its occurrences on the image.

3D reconstruction of an observed object, such as a part of the Earth or a building, can also be performed by bundle adjustment, as known from the literature. Using such a method, the tracking described above is replaced by searching for common features in the acquired set of images. Those features can be e.g. hand-crafted features (SIFT, SURF, . . . ) or a learnt features (for example, by neural networks). This process is typically performed as a post-processing step, in contrast to the feature-tracking approach described above which can be performed online.

Somewhat surprisingly, it has shown that such a search for common features can be done with accuracy good enough for high-precision 3D reconstruction, in spite of the variable wavelengths at which the features are imaged. However, to do the hyperspectral reconstruction, some additional steps may be implemented.

The 3D reconstruction method will output three things; the intrinsic parameters of the camera (focal length, lens distortion, etc), a set of extrinsic parameter sets (camera positions and orientations), up to one per image acquired, and a set of 3D points. Typically, a 3D surface polygon model is also computed. To be able to reconstruct the hyperspectral signature of a point, the 3D coordinates of that point can be projected onto the image plane of each acquired image using the corresponding extrinsic and intrinsic parameters. Then, using the resulting image coordinates, a hyperspectral signature can be reconstructed using the interpolation method described above. Additionally, if a surface model is computed, the hyperspectral signature of an arbitrary point on the surface can be estimated using the same interpolation method as above.

This process is extremely time and memory consuming, and thus difficult to use in practice. Thus, we propose a scheme where one or more steps can be made offline and the remaining be made online.

Below, it is assumed that all the acquired images are stored in a database, each image accessible with its index number.

In a first step, for each reconstructed 3D point P, the entire set of intrinsic and extrinsic camera parameters is traversed. For each match, that is, when the projection of the 3D point to the image plane results in valid image coordinates, the index of the image and the image coordinates p=(x,y) are stored. Note that the x image coordinate implicitly tells the wavelength at which the 3D point is measured in that particular image. Thus, instead of the x coordinate, the center $\lambda_c$ (x,y) wavelength could be stored. Additionally, instead of the y coordinate and the image index number, the (interpolated) image value at the coordinate p could be stored directly. This choice depends on which of the steps below that should be executed.

As an optional next step, for each reconstructed 3D point, remove superfluous index-coordinate pairs, that is, such index-coordinate pairs (i,p) where the x coordinate is close to other index-coordinate pairs or where x coordinate is outside a pre-defined range. This step is not strictly necessary, but can significantly speed up the interpolation process.

As an optional next step, for each 3D point, collect image patches centered around each of the collected index-coordinate pairs. Align this set of image using an image matching technique, such as normalized cross correlation, in order to refine the image coordinates.

As the next step, reconstruct the hyperspectral signature of the 3D point. This can be done offline or online (when accessing that particular point). The reconstruction is performed by traversing the stored index-coordinate pairs for the 3D point, interpolating the image value at each of these (if not already done in the first step), and feeding the resulting z to the previously described hyperspectral interpolation algorithm. Interpolation of the image value can be done using standard methods from the literature.

If a surface model has been computed, hyperspectral reconstruction can be performed at any point on this surface. For such a 3D point P, the first step is to identify the surface element to which P belongs. Second, the barycentric coordinates p' of P in the identified surface element is computed. The barycentric coordinates can then be used as weight on the corresponding hyperspectral signatures and thus compute the hyperspectral signature of P.

The invention claimed is:

1. A method of providing a hyperspectral image of a scene comprising a point, comprising:
providing an imaging device comprising a two-dimensional image sensing unit having a spectral characteristic, which varies along at least one direction in a plane parallel with an image sensor,
acquiring a first two-dimensional image of the scene, the first image comprising the point, wherein the spectral content of the scene varies along the direction as a consequence of the varying spectral characteristic of the image sensing unit,
moving the imaging device and the scene relative to each other,
acquiring a second two-dimensional image of the scene, the second image comprising the point, wherein the spectral content of the scene varies along the direction as a consequence of the varying spectral characteristic of the image sensing unit,
a) identifying the point in the second image as a second pixel at a position depicting the point,
b) providing a spectral vector of the point,
c) providing an applicability vector of the point to describe, with respect to predetermined wavelengths, the spectral characteristic of the image sensing unit at a position where the point is depicted,
d) providing an applicability vector of the second pixel, said applicability vector describing, with respect to a predetermined wavelength, the spectral characteristic of the image sensing unit at the position of the second pixel,
e) providing an updated spectral vector of the point based on the applicability vector of the point, the spectral vector of the point, a spectral value of the second pixel and the applicability vector of the second pixel,
f) repeating the above steps a) to e) for at least one different point of the first two-dimensional image of the scene, to provide a respective updated spectral vector for the point and the different point, and to generate the hyperspectral image of the scene comprising the respective updated spectral vector for the point and the different point;
wherein the spectral vector of the point is provided as an N-dimensional vector comprising a predetermined number of wavelengths, wherein N preferably is 5-150.

2. The method as claimed in claim 1, further comprising providing an updated applicability vector based on the applicability vector of the point and the applicability vector of the second pixel.

3. The method as claimed in claim 2, wherein the updated applicability vector is provided as a maximum, on an element by element basis, of the applicability vector of the point and the applicability vector of the second pixel.

4. The method as claimed in claim 1, wherein identifying the point comprises using the spectral vector of the point.

5. The method as claimed in claim 4, wherein the identifying comprises identifying the point based on a difference between the second spectral value and the spectral vector.

6. The method as claimed in claim 4, wherein the identifying comprises identifying the point based on the spectral vector, the second spectral value, the applicability vector of the point and the applicability vector of the second pixel.

7. The method as claimed in claim 1, wherein identifying the point in the second image comprises providing a model of a neighborhood of the point in one of the images, and matching the model to the one of the images.

8. The method as claimed in claim 1, further comprising determining a respective observation angle of the point based on respective positions of the point in the first and second images and a reference distance, and determining a distance between the imaging device and the point based on the angles and the reference distance.

9. The method as claimed in claim 1, wherein providing a spectral vector of the point comprises assigning a first spectral value of a first pixel depicting the point in the first image.

10. The method as claimed in claim 1, wherein providing a spectral vector of the point comprises receiving the spectral vector already updated based on the first image.

11. The method as claimed in claim 1, wherein the varying spectral characteristic is provided by a variable optical filter arranged adjacent the image sensor and wherein the method further comprises providing the applicability vector of the point based on a transmittance of the optical filter at each wavelength at the respective position of the image sensor where the point is identified.

12. The method as claimed in claim 1, wherein a respective spectral vector is provided for a predetermined number of points in the scene, said predetermined number of points being sufficient to positively identify an object or absence of an object in the scene.

13. The method as claimed in claim 1, wherein acquiring the first and/or second image comprises acquiring an image wherein the point occurs only once.

14. The method as claimed in claim 1, wherein acquiring the first and/or second image comprises acquiring an image wherein the point occurs at least twice.

15. The method as claimed in 14, further comprising determining a respective observation angle of the points based on respective positions of the occurrences of the point in the first and/or second images and a distance which is an intrinsic distance of the imaging device.

16. The method as claimed in claim 1, wherein the method comprises interpolating at least one element of the spectral vector, which element corresponds to a wavelength for which measurement has been made with respect to the point,
preferably, the estimation is performed based on the applicability vector.

17. The method as claimed in claim 1, further comprising:
if the point has moved more than one column on the image sensing unit between the first and second images,
then estimating, preferably by interpolating, elements of the spectral vector corresponding to wavelengths where no measurement has been done,
preferably, the estimation is performed based on the applicability vector.

18. An imaging device, comprising:
a two-dimensional image sensor, presenting first and second mutually orthogonal directions,
an optical filter, arranged in an optical path to the image sensor,
wherein the optical filter is an optical variable bandpass filter, the transmittance of which varies along on the first direction and being constant along the second direction,
wherein the optical filter extends over at least 90%, preferably 95%, or preferably 99% of a length of the image sensor in the first and second directions, respectively, and
wherein the imaging device is arranged to acquire two-dimensional images of a scene, wherein the spectral content of the scene as depicted on the images varies along the first direction as a consequence of the varying transmittance of the optical filter.

19. The imaging device as claimed in claim 18, further comprising a processing device, which is configured to perform the method as claimed in claim 1.

* * * * *